United States Patent
Hatakenaka et al.

(10) Patent No.: US 6,721,011 B1
(45) Date of Patent: Apr. 13, 2004

(54) ELECTRONIC CAMERA

(75) Inventors: Akira Hatakenaka, Hino (JP); Akio Terane, Sagamihara (JP); Masaomi Tomizawa, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/149,620

(22) Filed: Sep. 8, 1998

(30) Foreign Application Priority Data

Sep. 9, 1997 (JP) ............................................. 9-244476

(51) Int. Cl.[7] ............................................... H04N 5/222
(52) U.S. Cl. ............................... 348/333.02; 348/333.01
(58) Field of Search ........................... 348/232, 333.02, 348/231.99, 231.2, 231.9, 333.11, 333.12, 333.01

(56) References Cited

U.S. PATENT DOCUMENTS

| | | | | |
|---|---|---|---|---|
| 5,500,743 A | * | 3/1996 | Sakaegi et al. | 358/403 |
| 5,742,339 A | * | 4/1998 | Wakui | 348/231.9 |
| 5,806,072 A | * | 9/1998 | Kuba et al. | 348/231 |
| 5,966,553 A | * | 10/1999 | Nishitani et al. | 348/64 |
| 5,978,607 A | * | 11/1999 | Teremy et al. | 396/288 |
| 6,020,982 A | * | 2/2000 | Yamauchi et al. | 358/401 |
| 6,097,431 A | * | 8/2000 | Anderson et al. | 348/231.7 |
| 6,147,703 A | * | 11/2000 | Miller et al. | 348/220.1 |
| 6,292,217 B1 | * | 9/2001 | Uehara et al. | 348/207 |

* cited by examiner

Primary Examiner—Andrew Christensen
Assistant Examiner—Eric Wisdahl
(74) Attorney, Agent, or Firm—Volpe and Koenig, P.C.

(57) ABSTRACT

An electronic camera comprises an encoding/decoding unit for compressing/decompressing digital data obtained by an image sensing unit and processed by a signal processing unit, a recording medium for recording the encoded data, a display control unit which outputs a display image signal upon reception of an output from the signal processing unit and incorporates a character generator for a frame number display, and a display for displaying an image and a frame number on the basis of an output from the display control unit, wherein when a change of the display frame number is instructed by increment and decrement switches, a frame number being displayed, a frame number to be displayed, and an arrow representing shift of the display are superimposed and displayed on an image being displayed.

8 Claims, 2 Drawing Sheets

ELECTRONIC CAMERA

BACKGROUND OF THE INVENTION

The present invention relates to an electronic camera and, more particularly, to an electronic camera for reconstructing and displaying a plurality of pickup images.

In recent years, electronic cameras for electrically recording an optical image of a subject by converting the image into an electrical signal using the photoelectric conversion action of a semiconductor represented by silicon have practically been used instead of so-called silver salt cameras for recording an image on a film using the chemical photosensitive action of silver halide. Of such electronic cameras, so-called digital cameras for digitally recording an electrical signal are becoming a major stream.

To meet the user's demand for higher-quality images along with development of the electronic camera market, a CCD having a larger number of pixels is used as a photoelectric conversion element. However, an increase in the number of CCD pixels increases image data, and thus the electronic camera requires a large-capacity recording medium to record an image or a long time to transfer an image. To solve this problem, the data amount is generally compressed/decompressed by encoding/decoding image data.

An image is encoded/decoded using an arithmetic device such as a RISC (Reduced Instruction Set Computer) in order to increase the speed as much as possible. Nevertheless, processing image data made of pixel data of several hundred thousand or more pixels inevitably spends a certain time.

For this reason, even if the user instructs reconstruction of the next frame while a given frame of a recorded image is reconstructed, the next frame is only displayed after a long time. The user may misunderstand that the user failed to depress the button and repeatedly instruct reconstruction of the next frame, or may misunderstand that an error occurs in the electronic camera and turn off the power supply.

BRIEF SUMMARY OF THE INVENTION

It is an object of the present invention to provide an electronic camera capable of allowing the user to reliably recognize operation.

According to the present invention, there is provided an electronic camera comprising an image sensing unit for sensing an image, and generating and processing image data, an image-pickup/reconstruction unit for recording the image data from the image sensing unit on a recording medium and reconstructing a plurality of images from the recording medium, a display unit for displaying the plurality of reconstructed images, and a display control unit which has a frame number superimposition function of superimposing a defined frame number on each image in displaying an image on the display unit, and displays an image together with a frame number on the display unit, wherein the display control unit superimposes, on the first image, both a first frame number related to a first image as an image being displayed and a second frame number related to a second image as an image being processed so as to display the second image on the basis of a display command having already been issued, and displays the first image superimposed with the first and second frame numbers on the display unit.

According to the present invention, there is provided an electronic camera wherein the display control unit superimposes, on the first image, an auxiliary identification mark for facilitating identification of a relationship between the first frame number and the second frame number.

According to the electronic camera of the present invention, the display displays a plurality of images picked-up and reconstructed, and the frame number superimposition unit superimposes a frame number defined for each image on the image and displays the image with the corresponding frame number in displaying the image on the display. Further, the frame number superimposition unit superimposes, on the first image, both the first frame number as a frame number related to the first image as an image being displayed and the second frame number as a frame number related to the second image as an image being processed so as to display the second image on the basis of a display command having already been issued, and displays the first image superimposed with the first and second frame numbers.

According to the electronic camera of the present invention, the frame number superimposition unit further superimposes, on the first image, an auxiliary identification mark for facilitating identification of the relationship between the first frame number and the second frame number and displays the first image with the auxiliary identification mark.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described below with reference to the several views of the accompanying drawing.

Figure 1:
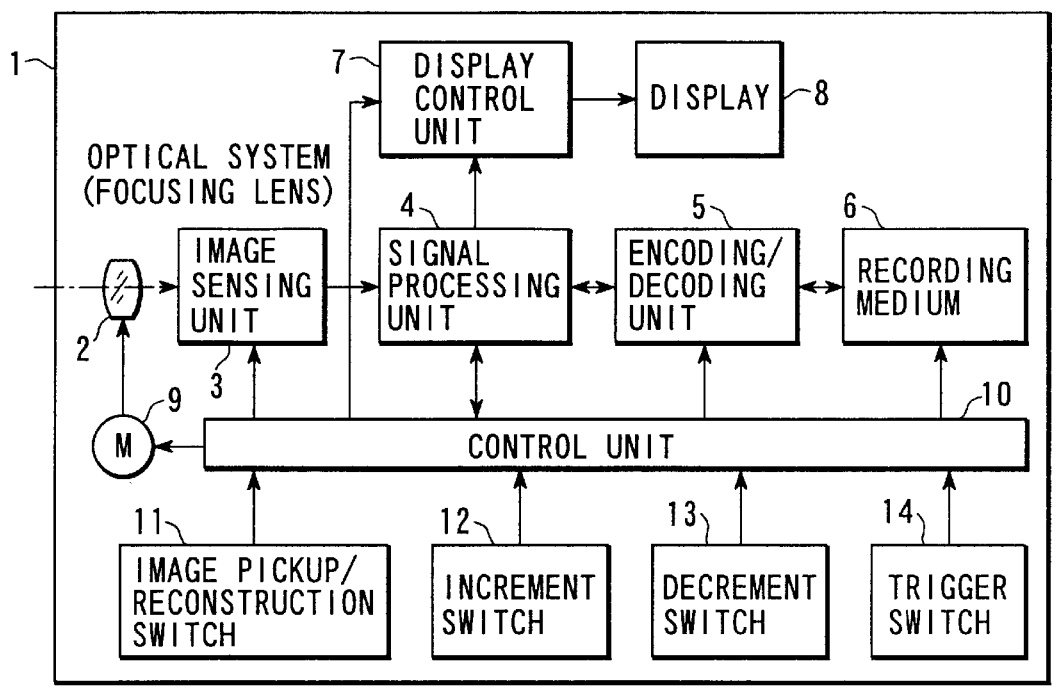
FIG. 1 is a block diagram showing the arrangement of an electronic camera according to an embodiment of the present invention.
Figure 2:
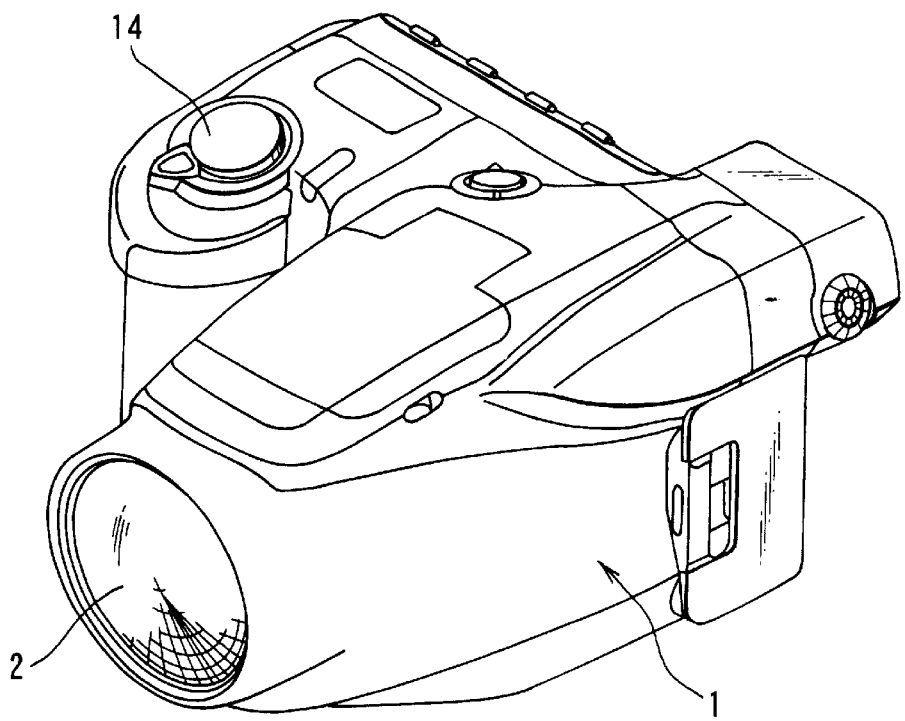
FIG. 2 is a perspective view showing the front-side outer appearance of the electronic camera according to the embodiment.
Figure 3:
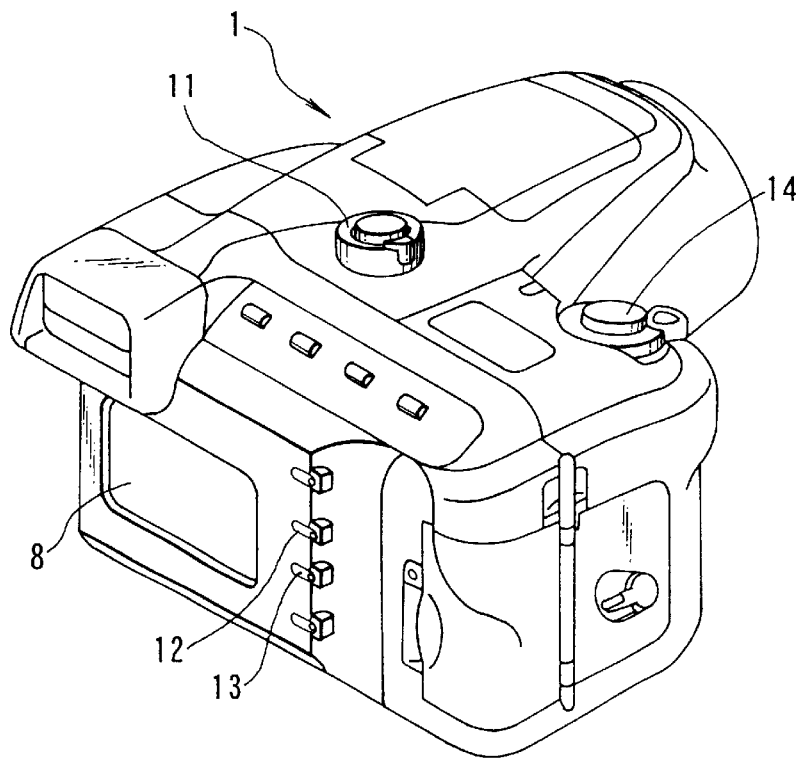
FIG. 3 is a perspective view showing the rear-side outer appearance of the electronic camera according to the embodiment.

As shown in FIGS. 1 to 3, in an electronic camera 1, an optical system 2 having a focusing lens for adjusting the focal point in order to form a subject image on an imaging plane (to be described later) faces an image sensing unit 3 for photoelectrically converting the subject image formed on the imaging plane by the optical system 2 and further converting the analog signal into a digital signal. The output terminal of the image sensing unit 3 is connected to a signal processing unit 4 for performing various processes for the digital signal output from the image sensing unit 3. An encoding/decoding unit 5 is connected to the signal processing unit 4 and a recording medium 6, and performs encoding to compress output data from the signal processing unit 4 and decoding to decompress data compressed and recorded on the recording medium 6. The recording medium 6 is constituted by, e.g., a flash memory incorporated in or detachably mounted in the electronic camera 1 in order to record and save data encoded by the encoding/decoding unit 5. A display control unit 7 is connected to the signal processing unit 4, outputs a signal for displaying an image upon reception of an output from the signal processing unit 4, and has a frame number superimposition function incorporating a character generator for generating a frame number display character and the like. A display 8 connected to the output terminal of the display control unit 7 is controlled based on an output from the display control unit 7, and is constituted by, e.g., an LCD arranged on the rear side of the electronic camera 1 in order to display an image, a frame number, and the like. A focusing motor 9 is coupled to the optical system 2 in order to drive the focusing lens of the optical system 2.

A control unit 10 is connected to the image sensing unit 3, the signal processing unit 4, the encoding/decoding unit 5, the recording medium 6, the display control unit 7, the motor 9, an image-pickup/reconstruction switch 11, an increment switch 12, a decrement switch 13, and a trigger switch 14, and integrally controls the electronic camera 1.

The image-pickup/reconstruction switch 11 is used to switch the mode of the electronic camera 1 between image-pickup and reconstruction modes, and arranged as a substantially ring-like pivot switch at almost the center of the top of the electronic camera 1. The increment switch 12 is used to increment an item whose order is defined, e.g., the frame number, whereas the decrement switch 13 is used to decrement it. The increment and decrement switches 12 and 13 are arranged as depression switches on the right side of the display 8. The trigger switch 14 is used to input an image-pickup/recording command to the electronic camera 1, and arranged as a depression switch at a position where the user can depress it with the user's forefinger when gripping the electronic camera 1 with his or her right hand.

The image-pickup operation of the electronic camera 1 having this arrangement will be explained.

In image pickup, the mode of the electronic camera 1 is set in the image pickup mode by the image-pickup/reconstruction switch 11. Then, power is supplied to the image sensing system including the image sensing unit 3 and the focusing motor 9. At this time, a subject image formed on the imaging plane of the image sensing unit 3 by the optical system 2 is converted into a digital image signal in the image sensing unit 3. The digital image signal output from the image sensing unit 3 is processed by the signal processing unit 4 and displayed on the display 8 via the display control unit 7. The user determines, e.g., the composition of the subject while seeing the display on the display 8.

The image data of the signal processing unit 4 is also input to the control unit 10, and the control unit 10 determines whether the focal position is proper. When the focal position is improper, the control unit 11 controls the focusing motor 9 to drive the focusing lens of the optical system 2 to an in-focus position.

When the focal position, the composition, and the like are proper, and the user depresses the trigger switch 14 to record the image, the control unit 11 controls the signal processing unit 4, the encoding/decoding unit 5, and the recording medium 6 to encode the image data of the signal processing unit 4 by the encoding/decoding unit 5 and record the encoded data as, e.g., one file unit per image on the recording medium 6 on the basis of a predetermined format. At this time, the image file includes, as data, image data and attendant data including a frame number defined for this image data.

The operation of reconstructing an image recorded by the electronic camera 1 will be explained.

Figure 4A:
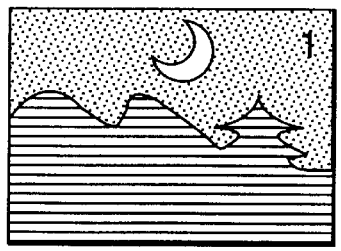
FIGS. 4A, 4B, and 4C are views showing frame shift in reconstructing an image in the embodiment.

In reconstruction, the mode of the electronic camera 1 is set in the reconstruction mode by the image-pickup/reconstruction switch 11. When the number of a frame to be reconstructed is designated by the increment and decrement switches 12 and 13, the control unit 10 accesses the recording medium 6 in accordance with the designated frame number, and image data corresponding to this frame number is read out from the recording medium 6. For example, when the first frame is to be reconstructed, the first frame is designated by the increment switch 12, and image data of the first frame is read out. This image data is decoded by the encoding/decoding unit 5 and displayed on the display 8 via the signal processing unit 4 and the display control unit 7, as shown in FIG. 4A. The display control unit 7 generates a character corresponding to the frame number (in this case, 1) with the incorporated character generator, and superimposes the character on the image data and displays the image with the character.

When the user wants to display the second frame and operates the increment switch 12, the control unit 10 starts control to reconstruct the second frame.

Figure 4B:
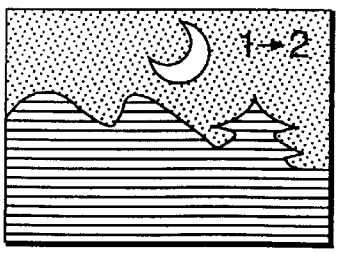

More specifically, image data of the second frame is read out from the recording medium 6 and decoded by the encoding/decoding unit 5. In response to the operation of the increment switch 12, the display control unit 7 generates a frame number (in this case, 1) during display, a frame number (in this case, 2) to be reconstructed, and an arrow as an auxiliary identification mark representing that current display of frame number 1 is shifting to display of frame number 2, superimposes them on the image data, and displays them on the display 8, as shown in FIG. 4B.

Figure 4C:
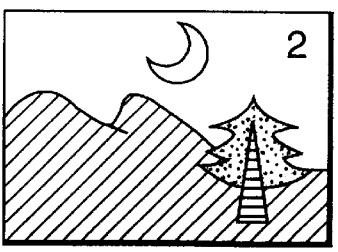

Upon completion of decoding by the encoding/decoding unit 5, the image of the second frame is displayed on the display 8 via the signal processing unit 4 and the display control unit 7, as shown in FIG. 4C. At the same time as the display of the second frame, the display representing shift of the frame ends, and only the number (in this case, 2) of the displayed frame is displayed.

Such display is similarly performed when display of the second frame is shifted to display of the third frame, when the number of a frame to be displayed is decremented by operating the decrement switch 13, and when display is shifted to a frame arbitrarily designated.

According to this embodiment, a state that the image to be displayed is now shifted is displayed during an interval between designation for displaying a next frame and actual display. Accordingly, even if a long time is spent for encoding/decoding, the user can reliably recognize the operation without misunderstanding that the user erroneously operated the electronic camera 1.

As for the auxiliary identification mark, two frame numbers can be identified by the positional relationship between the two frame numbers even without any auxiliary identification mark, e.g., any arrow in the above embodiment. If the frame numbers are hard to identify, different display character sizes or fonts can be used for two frame numbers to enhance the identifiability. Even in this case, however, the user desirably understands, e.g., the positional or character size relationship between two frame numbers with, e.g., the instruction manual so as not to cause erroneous identification due to misunderstanding of the user. To the contrary, using a proper auxiliary identification mark such as an arrow in the above embodiment effectively facilitates identification without any preliminary understanding.

As has been described above, according to the electronic camera of the present invention, the user can reliably recognize operation of changing the display image. Further, the relationship between the first frame number and the second frame number can be more easily identified.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed:

1. An electronic camera comprising:

an image sensing unit that generates and processes image data;

a record unit that records the image data from the image sensing unit on a recording medium;

an image designating switch that designates an image to be regenerated by a user of the electronic camera; and a display control unit that displays a first image regenerated from the image data and displays an indication representing that the display unit is performing a display process to display a second image;

wherein the indication initially appears and remains superimposed on the first image throughout a first time interval, the first time interval beginning when the user operates the image designating switch to display a second image regenerated from the image data and ending when the second image is displayed;

wherein the indication comprises a second frame number associated with the second image and the second frame number appears when the user operates the image designating switch to display a second image regenerated from the image data.

2. The electronic camera of claim 1, wherein the indication comprises an arrow.

3. The electronic camera of claim 1, further comprising a first frame number associated with the first image, wherein the display control unit displays the first frame number superimposed on the first image when the first image is displayed.

4. The electronic camera of claim 3, wherein the indication further comprises an arrow.

5. The electronic camera of claim 4, wherein the arrow points toward the second frame number.

6. The electronic camera of claim 1, wherein the indication comprises a positional relationship between the first and second frame numbers.

7. The electronic camera of claim 6, wherein the indication comprises the display of the first image number in a different font than the second image number.

8. The electronic camera of claim 7, wherein the indication comprises the display of the first image number in a different size than the second image number.

* * * * *

UNITED STATES PATENT AND TRADEMARK OFFICE
CERTIFICATE OF CORRECTION

PATENT NO. : 6,721,011 B1
DATED : April 13, 2004
INVENTOR(S) : Hatakenaka et al.

It is certified that error appears in the above-identified patent and that said Letters Patent is hereby corrected as shown below:

<u>Column 6,</u>
Line 21, after the word "claim", delete "3" and insert therefor -- 1 --.

Signed and Sealed this

Thirty-first Day of August, 2004

JON W. DUDAS
*Director of the United States Patent and Trademark Office*